United States Patent [19]

Smith

[11] Patent Number: 5,608,663
[45] Date of Patent: Mar. 4, 1997

[54] COMPUTATIONAL ARRAY CIRCUIT FOR PROVIDING PARALLEL MULTIPLICATION

[75] Inventor: Stephen L. Smith, Chandler, Ariz.

[73] Assignee: Motorola, Inc., Schaumburg, Ill.

[21] Appl. No.: 398,273

[22] Filed: Mar. 3, 1995

[51] Int. Cl.⁶ .................................................. G06F 17/11
[52] U.S. Cl. .................... 364/748.5; 364/735; 364/750.5
[58] Field of Search ............................. 364/748.5, 735, 364/750.5, 724.16

[56] References Cited

U.S. PATENT DOCUMENTS

| | | | |
|---|---|---|---|
| 3,610,901 | 10/1971 | Lynch | 364/748.5 |
| 3,922,536 | 11/1975 | Hampel et al. | 364/735 |
| 4,555,768 | 11/1985 | Lewis, Jr. et al. | 364/748.5 |
| 4,720,809 | 1/1988 | Taylor | 364/748.5 |
| 5,060,181 | 10/1991 | Matsuoka | 364/735 |

OTHER PUBLICATIONS

"A 10–ns Hybrid Number System Data Execution", Fang–shi Lai, IEEE Journal Of Solid–State Circuits, vol. 26, No. 4, Apr. 1991.

"A Hybrid Number System Processor With Geometric And Complex Arithmetic Capabilities", Fang–shi Lai and Ching–Fam Eric Wu, IEEE Transactions On Computers, vol. 40, No. 8, Aug. 1991.

"The Efficient Implementation And Analysis Of A Hybrid Number System Processor", Fang–shi Lai, IEEE Transactions On Circuits And Systems—II: Analog And Digital Signal Processing, vol. 40, No. 6, Jun. 1993.

*Primary Examiner*—David H. Malzahn
*Attorney, Agent, or Firm*—S. Kevin Pickens

[57] ABSTRACT

A computational array circuit (100) performs parallel multiplications with an adder array (140). The computational array circuit converts a floating point input value to a logarithmic input value. The logarithmic input value is then added to a logarithm of a multiplier value by an adder circuit (145) in each of a number of array elements (150) of the adder array (140). The computational array circuit (100) converts the resulting logarithmic output value from each of the array elements (150) to an antilogarithmic output value. The antilogarithmic output value from each of the array elements is thus the mathematical equivalent of the floating point input value multiplied by the multiplier value. The computational array circuit (100) thus obtains the advantage of floating point precision and range while requiring far less physical area than floating point multipliers would require to perform the same functions.

18 Claims, 4 Drawing Sheets

COMPUTATIONAL ARRAY CIRCUIT FOR PROVIDING PARALLEL MULTIPLICATION

TECHNICAL FIELD

This invention relates generally to computer circuits and, more particularly, to computational arrays.

BACKGROUND OF THE INVENTION

A computational array of multipliers can be employed for various computer and electronics applications requiring parallel multiplication. For example, a computational array of multipliers can be used to obtain a sum of products from one or more input values. Typically, the multipliers in such a computational array are designed to multiply fixed point data. However, fixed point multipliers have a limited accuracy and a limited dynamic range of representable values, given practical restraints on data format size. These limitations on dynamic range and accuracy render fixed point multipliers insufficient for use in the performance of many computer functions.

Acceptable dynamic range and accuracy for these computer functions can often be obtained by using floating point data. Unfortunately, however, floating point multiplier circuits require a great deal of hardware overhead. This hardware overhead includes a greater physical area and a slower operation than fixed point multipliers. An entire computational array of floating point multipliers would require such a large physical area and would slow operation to such an extent that the performance of many computer functions would be prohibited. Thus, a more efficient computational array is needed for accomplishing parallel multiplications.

DESCRIPTION OF THE PREFERRED EMBODIMENT

In a preferred embodiment of the invention, a computational array circuit is provided which performs parallel multiplications of a floating point input value by a multiplier value. The computational array circuit employs an adder array having a number of array elements. Each array element has an adder circuit, rather than a multiplier. The computational array circuit achieves parallel multiplication by converting the floating point input value to a logarithmic input value which is then added to a logarithm of a multiplier value by the adder circuit in each array element. The computational array circuit converts the resulting logarithmic output value from each array element to an antilogarithm. This resulting antilogarithm is the mathematical equivalent of the floating point input value multiplied by the multiplier value.

By converting the input values to logarithmic values and using adder circuits to achieve parallel multiplication, the computational array circuit of the preferred embodiment of the invention attains the advantage of floating point precision and range while also having the advantage of requiring far less physical area than floating point multipliers would require. As a result, many computer functions can be performed that would otherwise be prohibited. Further, in a particularly preferred embodiment, the logarithmic values are represented by a hybrid logarithmic data format which is designed to be compatible with the floating point data format that represents the floating point values. Thus, conversion between floating point values and logarithmic values is accomplished efficiently.

Figure 1:
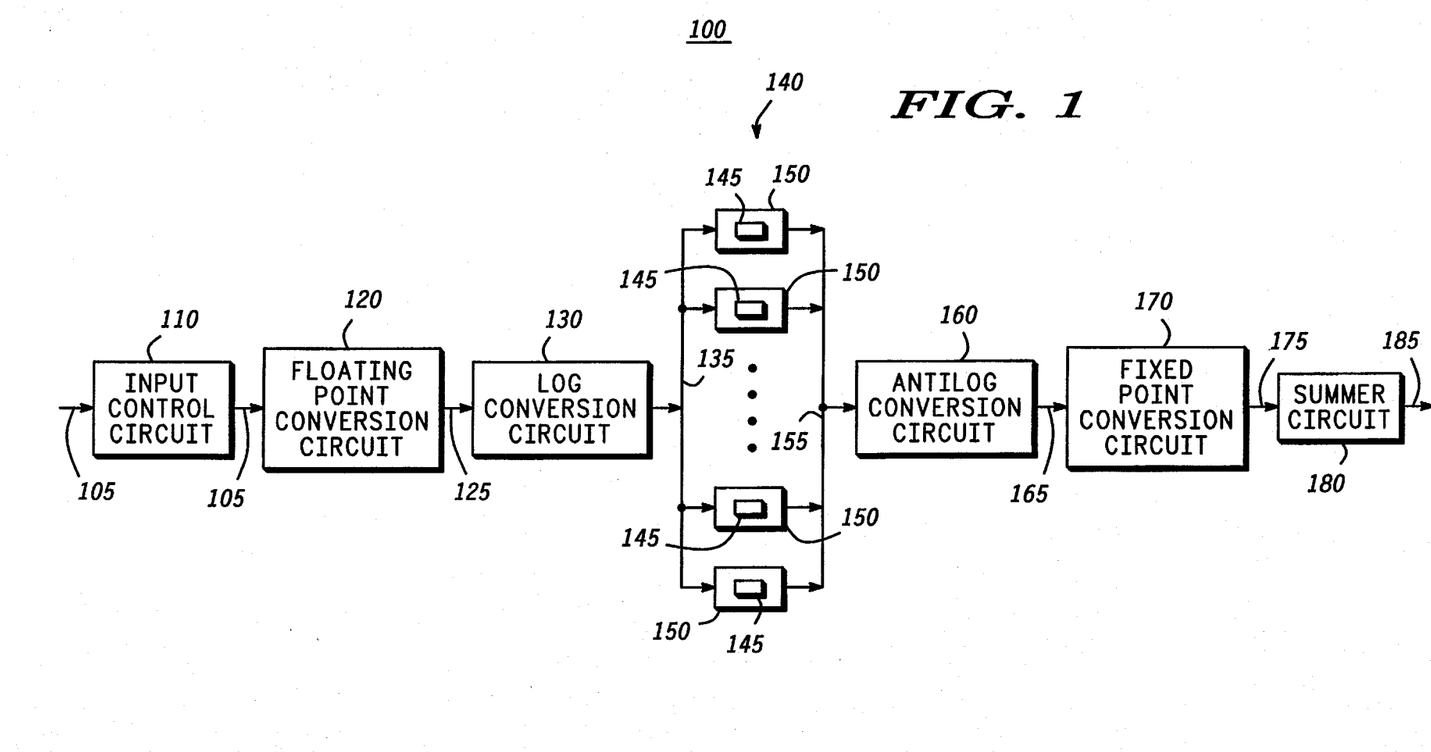
FIG. 1 is a is a block circuit diagram of a computational ray circuit in accordance with an implementation of the preferred embodiment of the invention.

FIG. 1 shows a block circuit diagram of an implementation of the preferred embodiment of the present invention. The implementation shown in FIG. 1 calculates a sum of products of an input value which can have a fixed or floating point data format. The sum of products operation has many valuable applications, such as digital signal processing and polynomial solving. A computational array circuit 100 receives an input data signal which represents the input value. The computational array circuit 100, whose operation will be explained in more detail below, performs a parallel multiplication, as explained above, by using an adder array 140 with an adder circuit 145 in each of the array elements 150. The resulting products may then be converted to a fixed point data format. The computational array circuit 100 then sums the resulting products from the array elements 150 with a summer circuit 180 to produce an output sum data signal which represents an output value that is the sum of the products of the input data signal and the multiplier values in each of the array elements 150.

Figure 2:
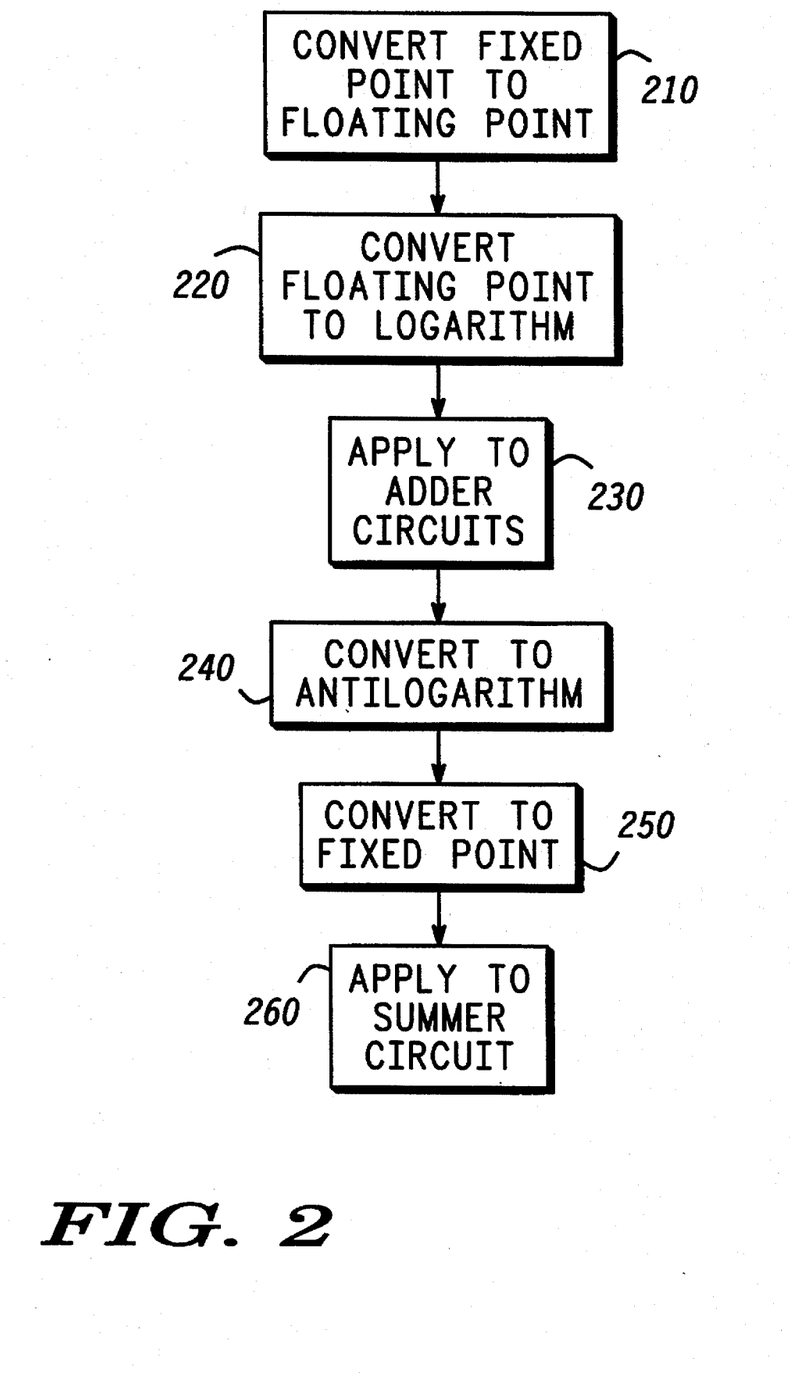
FIG. 2 is a higher level flowchart of the process performed by the computational array circuit of FIG. 1.

FIG. 2 shows a higher level flowchart of the process performed by the computational array circuit 100 shown in FIG. 1. In step 210, if the input data signal represents the input value with a fixed point data format, the computational array circuit 100 converts the input data signal to a floating point input data signal which represents the input value with a floating point data format. The floating point data format used in this implementation of the preferred embodiment will be described later in more detail.

In step 220, the computational array circuit 100 converts the floating point input data signal to a logarithmic input data signal representing a logarithm of the input value. In step 230, the logarithmic input data signal is broadcast to different array elements 150 in the adder array 140. Each of the array elements 150 includes an adder circuit 145. The specific operation of the adder circuit 145 will be discussed later in more detail. The adder circuit 145 adds the logarithmic input data signal to a logarithmic multiplier data signal stored therein which represents a logarithm of a multiplier value to produce a logarithmic output data signal representing a logarithmic output value.

In step 240, the computational array circuit 100 converts the logarithmic output data signal from each adder circuit 145 to an antilogarithmic output data signal representing an antilogarithm of the logarithmic output value. Each such antilogarithm is the mathematical equivalent of the product of the input value and the multiplier value from the corresponding adder circuit 145. In step 250, the antilogarithmic output data signals for all of the array elements 150 in the adder array 140 are each converted to a fixed point output data signal representing an output value with a fixed point data format, thus producing a fixed point output data signal representing the output value with a fixed point data format. Finally, in step 260, the fixed point output data signals are applied to a summer circuit to obtain an output sum data signal representing the sum of these products.

The computational array circuit 100 which performs the above process will now be described in greater detail. Returning to FIG. 1, as noted above, the computational array circuit 100 produces a sum of products of an input value. An input data signal representing the input value is received via an input data bus 105 by an input control circuit 110. The input control circuit 110 is a conventional circuit readily obtained and implemented by one of ordinary skill in the art, such as an I/O controller. The input control circuit 110 controls the flow of the input data signal over the input data bus 105.

The input data signal in this implementation may represent the input value with a fixed point data format. The fixed point data format is well known in the art and is popularly used as a simple format to represent decimal values in binary form. Thus, it is advantageous to be able to perform operations on values represented in this format. A floating point conversion circuit 120 receives the input data signal via the input data bus 105 and converts the input data signal to a floating point input data signal which represents the input value with a floating point data format, as will be described below. The floating point conversion circuit 120 is, for example, a circuit such as that described in the U.S. patent application entitled "Floating Point Conversion Circuit", filed Mar. 6, 1995 and having Ser. No. 08/399,257, which is hereby incorporated by reference. Although in the particularly preferred embodiment described herein, the input data signal is in a fixed point data format, it is noted that the inventive concept disclosed herein may be applied to any original data format including, for example, a different floating point format such as the 32-bit IEEE format that will be referenced below.

Figure 3:
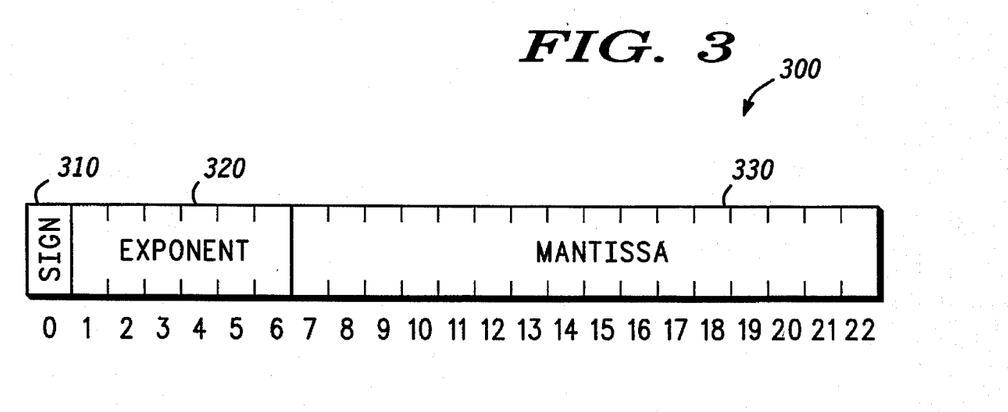
FIG. 3 is a diagram of the floating point data format utilized in the computational array circuit of FIG. 1.

In a particularly preferred embodiment, the floating point data format of the floating point input data signal is as shown in FIG. 3. In FIG. 3, the floating point data format 300 includes a floating point sign bit 310 (S), a floating point exponent portion 320 (E) and a floating point mantissa portion 330 (M). The floating point exponent portion 320 comprises 6 bits and the floating point mantissa portion 330 comprises 16 bits. Thus, the floating point data format 300 comprises 23 bits in all. The value (x) represented by the floating point data format 300 is interpreted as:

$$x=(-1)^S(2)^{E-32}(1.M)$$

The floating point conversion circuit 120 provides the floating point input data signal via a floating point input data bus 125 to a logarithmic conversion circuit 130. The logarithmic conversion circuit 130 converts the floating point input data signal to a logarithmic input data signal representing a logarithm of the input value with a logarithmic data format. An example conversion method and corresponding architecture for implementing the logarithmic conversion circuit 130 are disclosed in "A 10-ns Hybrid Number System Data Execution Unit for Digital Signal Processing Systems" IEEE Journal of Solid-State Circuits, Volume 26, No. 4, April 1991, which is hereby incorporated by reference.

Figure 4:
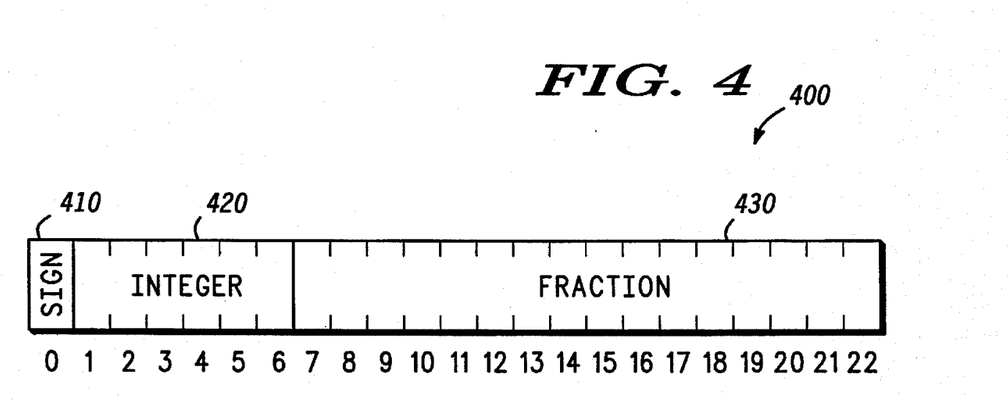
FIG. 4 is a diagram of the hybrid logarithmic data format utilized in the computational array circuit of FIG. 1.

In a particularly preferred embodiment, the logarithmic data format is a hybrid logarithmic data format 400 as shown in FIG. 4. The floating point data format 300 and the hybrid logarithmic data format 400 of the preferred embodiment differ from the data format described in the above-mentioned article only in that they are 23 bit formats instead of a 32 bit formats. The 23-bit format described herein has the advantage of consuming less physical area than the 32-bit IEEE format, and thus has been found to be desirable in a number of applications which are realized using a number of array elements. In FIG. 4, the hybrid logarithmic data format 400 includes a hybrid logarithmic sign bit 410 (S), a hybrid logarithmic integer portion 420 and a hybrid logarithmic fraction portion 430. The hybrid logarithmic integer portion 420 (I) comprises 6 bits and the hybrid logarithmic fraction portion 430 (F) comprises 16 bits. Thus, the hybrid logarithmic data format 400 comprises 23 bits in all. The value (x) represented by the hybrid logarithmic data format 400 is interpreted as:

$$x=(-1)^S(2)^{(I-32)+(0.F)}$$

Conversion from a floating point data format 300 to a hybrid logarithmic data format 400 and from the hybrid logarithmic data format 400 to the floating point data format 300 is performed efficiently by the computational array circuit 100. This is because, in addition to the floating point data format 300 and the hybrid logarithmic data format 400 having the same bit width, the floating point sign bit 310 and the hybrid logarithmic sign bit 410 both utilize the same bit, bit [0]. Further, the floating point exponent portion 320 and the hybrid logarithmic integer portion 420 both have a same number of bits and, in the implementation described herein, utilize the same bits [1]–[6]. Additionally, the floating point mantissa portion 330 and the hybrid logarithmic fraction portion 430 both have a same number of bits and, in the implementation described herein, use the same bits [7]–[22].

The logarithmic conversion circuit 130 broadcasts the logarithmic input data signal via a logarithmic input data bus 135 to an adder array 140 of array elements 150. Each of the array elements 150 contains an adder circuit 145. Each adder circuit 145 in each of the array elements 150 contains a conventional adder and a conventional memory for storing a logarithmic multiplier data signal and a power data signal representing a power value indicating a number of times the logarithmic input data signal is to be added by the adder to the logarithmic multiplier data signal.

Figure 5:
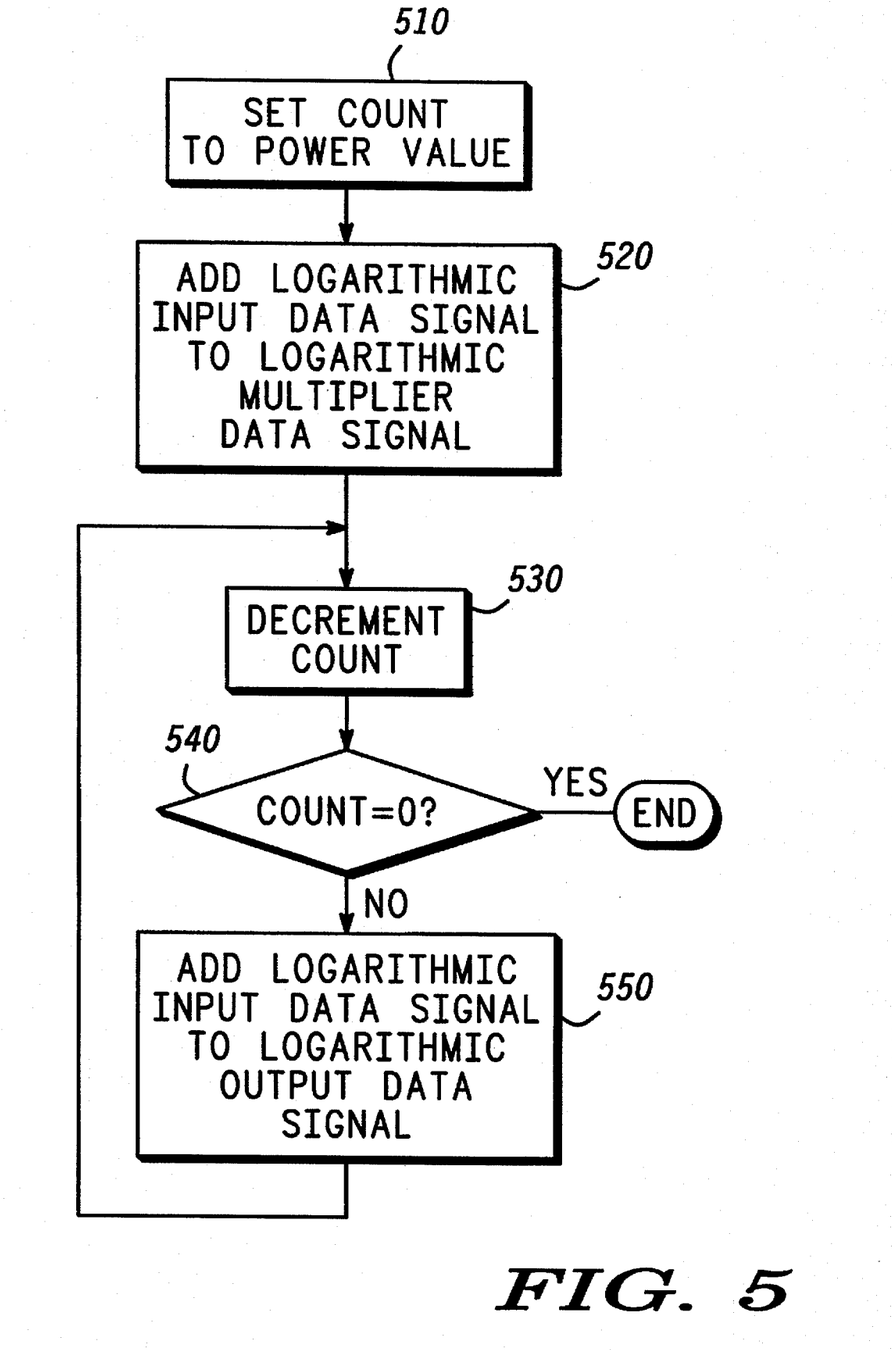
FIG. 5 is a flowchart of the process performed by the adder circuit in each of the array elements in the computational array circuit of FIG. 1.

FIG. 5 is a flowchart of the process performed by the adder circuit 145 in each of the array elements 150. In step 510, a count value is set to the power value which indicates the number of times the logarithmic input data signal is to be added by the adder to the logarithmic multiplier data signal. In step 520, the logarithmic input data signal is added to the logarithmic multiplier data signal to produce a logarithmic output data signal. In step 530, the count value is decremented. In step 540, the adder circuit determines whether the count value is equal to 0. If so, the process ends. Otherwise, the logarithmic input data signal is added to the logarithmic output data signal in step 550 to produce an updated logarithmic output data signal taken to a next power. Control then loops to repeat steps 530–550 until the count value reaches 0 and thus the finally desired logarithmic output value is represented by the logarithmic output data signal.

In a particularly preferred embodiment, the logarithmic multiplier data signal is a logarithmic weight data signal representing a logarithm of a weight value to be applied to the logarithmic input data signal. By applying a different weight value to the logarithmic input data signal and applying different exponent values, polynomial terms are solved in parallel. As an example of the application of the weight value and operation of the adder circuit 145 in a given one of the array elements 150, assume that the power value=3. The logarithmic input data signal representing a logarithmic input value log(x) is first added to the logarithmic weight data signal representing a logarithmic weight value log(w) to produce a logarithmic output data signal representing an accumulating logarithmic output value $\log(y)=\log(w)+\log(x)$. The logarithmic input data signal is then added to the logarithmic output data signal to produce an updated output data signal representing an updated logarithmic output value $\log(y)=\log(w)+\log(x)+\log(x)$. The logarithmic input data signal is then again added to the updated logarithmic output data signal to produce a final logarithmic output data signal representing the logarithmic output value $\log(y)=\log(w)+\log(x)+\log(x)+\log(x)$. Thus, it follows that $y=wx^3$. One of ordinary skill in the art will readily implement the adder circuit 145 to implement this process.

As explained above, adding the logarithmic input data signal to the logarithmic multiplier signal one or more times, as appropriate to the application at hand, produces a logarithmic output data signal representing a logarithmic output value for each of the array elements 150 in the adder array 140. Returning to FIG. 1, each of the array elements 150 supply the corresponding logarithmic output data signal via a logarithmic output data bus 155 to an antilogarithmic conversion circuit 160. An example conversion method and corresponding architecture for implementing the antilogarithmic conversion circuit 160 are disclosed in "A 10-ns Hybrid Number System Data Execution Unit for Digital Signal Processing Systems" IEEE Journal of Solid-State Circuits, Volume 26, No. 4, April 1991. The floating point data format 300 and the hybrid logarithmic data format 400 of the preferred embodiment differs from the data format described in the above-mentioned article only in that it is a 23 bit format instead of a 32 bit format, as described above.

The antilogarithmic conversion circuit 160 converts each logarithmic output data signal to an antilogarithmic output data signal. The antilogarithmic output data signals each represent an antilogarithm of the corresponding logarithmic output value. The antilogarithm of the logarithmic output data signal is the equivalent of the input value multiplied by the corresponding multiplier value for the number of times that the logarithmic input data signal was added to the logarithmic multiplier signal.

The antilogarithmic conversion circuit 160 supplies the antilogarithmic output data signals via an antilogarithmic output data bus 165 to a fixed point conversion circuit 170. The fixed point conversion circuit 170 will be readily implemented by one of ordinary skill in the art. The fixed point conversion circuit 170 essentially reverses the operation of the floating point conversion circuit 120 which is, for example, a circuit as is described in the U.S. patent application entitled "Floating Point Conversion Circuit", filed Mar. 6, 1995 and having Ser. No. 08,399,257. The fixed point conversion circuit 170 converts the antilogarithmic output data signals each to a fixed point output data signal having a fixed point format. The fixed point conversion circuit 170 provides the fixed point output data signal via a fixed point output data bus 175 to a summer circuit 180. The summer circuit 180 sums the fixed point output data signals to produce an output sum data signal. The output sum data signal represents a sum of the products of the input value by the various multiplier values in each of the array elements 150. For example, in a polynomial solving application, the summer circuit 180 sums the different terms of the polynomial, each having been raised to the appropriate power and multiplied by a weight value. Thereafter, the output sum data signal can be utilized by the relevant application, as appropriate. If desired, the output sum data signal can be converted to a floating point output sum signal having, for example, the 32-bit IEEE format described above.

The computational array circuit described above provides the advantages of performing parallel multiplication using adder circuits operating on logarithmic values, and thus requiring far less physical area than multipliers, while achieving floating point precision and range. Still greater advantages are obtained by utilizing a hybrid logarithmic data format which allows for efficient conversion to and from a floating point data format. While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

What is claimed is:

1. A computational array circuit for providing parallel multiplication of an input value, the computational array circuit comprising:

a floating point conversion circuit receiving an input data signal representing the input value with a fixed point data format, the floating point conversion circuit converting the input data signal to a floating point input data signal representing the input value with a floating point data format;

a logarithmic conversion circuit connected to the floating point conversion circuit via a floating point input data bus and receiving the floating point input data signal from the floating point conversion circuit via the floating point input data bus, the logarithmic conversion circuit converting the floating point input data signal to a logarithmic input data signal representing a logarithm of the input value;

an adder array of array elements connected to the logarithmic conversion circuit via a logarithmic input data bus and receiving the logarithmic input data signal from the logarithmic conversion circuit via the logarithmic input data bus, each of the array elements having an adder circuit adding the logarithmic input data signal to a logarithmic multiplier data signal representing a logarithm of a multiplier value to produce a logarithmic output data signal representing a logarithmic output value, and the adder circuit in at least one of the array elements adding the logarithmic input data signal to the logarithmic multiplier data signal a number of times based on a power data signal representing a power value indicating the number of times the logarithmic input data signal is to be added to the logarithmic multiplier data signal;

an antilogarithmic conversion circuit connected to the adder array via a logarithmic output data bus and receiving the logarithmic output data signal from each of the array elements in the adder array via the logarithmic output data bus, the antilogarithmic conversion circuit converting the logarithmic output data signal from each of the array elements to an antilogarithmic output data signal, the antilogarithmic output data signal for each of the array elements representing an antilogarithm of the logarithmic output value equivalent to the input value multiplied by the multiplier value the number of times indicated by the power data signal; and a fixed point conversion circuit connected to the antilogarithmic conversion circuit via a antilogarithmic output data bus and receiving the antilogarithmic output data signal from the antilogarithmic conversion circuit via the antilogarithmic output data bus, the fixed point conversion circuit converting the antilogarithmic output data signal to an output data signal representing an output value with a fixed point data format.

2. The computational array circuit of claim 1 wherein the multiplier value is a weight value.

3. The computational array circuit of claim 1, further comprising a summer circuit connected to the fixed point conversion circuit via a fixed point output data bus, and receiving a fixed point output data signal via the fixed point output data bus for each of the array elements to obtain a plurality of fixed point output data signals, the summer circuit summing the plurality of fixed point output data signals together to produce an output sum data signal.

4. The computational array circuit of claim 1 wherein the logarithmic input data signal converted by the logarithmic conversion circuit is represented by a same number of bits as the floating point input data signal.

5. The computational array circuit of claim 4 wherein the floating point input data signal has a floating point sign bit, a floating point mantissa portion and a floating point exponent portion, and the logarithmic input data signal has a logarithmic sign bit represented by a same number of bits as the floating point sign bit, a logarithmic integer portion represented by a same number of bits as the floating point mantissa portion, and a logarithmic fraction portion represented by a same number of bits as the floating point exponent portion.

6. The computational array circuit of claim 1 wherein the adder circuit in at least one of the array elements adds the logarithmic input data signal to the logarithmic multiplier data signal the number of times equal to the power value represented by the power data signal.

7. A computational array circuit for providing parallel multiplication of a floating point input value represented by a floating point input data signal, the computational array circuit comprising:

a logarithmic conversion means for converting the floating point input data signal to a logarithmic input data signal representing a logarithm of the floating point input value;

an adder array of array elements, each of the array elements operating in parallel and having an adder circuit adding the logarithmic input data signal to a logarithmic multiplier data signal representing a logarithm of a multiplier value to produce a logarithmic output data signal representing a logarithmic output value, and the adder circuit in at least one of the array elements adding the logarithmic input data signal to the logarithmic multiplier data signal a number of times based on a power data signal representing a power value indicating the number of times the logarithmic input data signal is to be added to the logarithmic multiplier data signal; and an antilogarithmic conversion means for converting the logarithmic output data signal from each of the array elements to an antilogarithmic output data signal representing an antilogarithm of the logarithmic output value equivalent to the floating point input value multiplied by the multiplier value the number of times indicated by the power data signal.

8. The computational array circuit of claim 7 wherein the multiplier value is a weight value.

9. The computational array circuit of claim 7, further comprising a summing means for summing, upon receiving the antilogarithmic output data signal for each of the array elements to obtain a plurality of antilogarithmic output data signals, the plurality of antilogarithmic output data signals together to produce an output data signal.

10. The computational array circuit of claim 7 wherein the adder circuit in at least one of the array elements adds the logarithmic input data signal to the logarithmic multiplier data signal the number of times equal to the power value represented by the power value signal.

11. The computational array circuit of claim 7 wherein the logarithmic input data signal converted by the logarithmic conversion means has a same number of bits as the floating point input data signal.

12. The computational array circuit of claim 11 wherein the floating point input data signal has a floating point sign bit, a floating point mantissa portion and a floating point exponent portion, and the logarithmic input data signal has a logarithmic sign bit represented by a same number of bits as the floating point sign bit, a logarithmic integer portion represented by a same number of bits as the floating point mantissa portion, and a logarithmic fraction portion represented by a same number of bits as the floating point exponent portion.

13. A method of performing parallel multiplication of an input value, the method comprising the steps of:

(a) converting an input data signal representing the input value with a fixed point data format to a floating point input data signal representing the input value with a floating point data format;

(b) converting the floating point input data signal to a logarithmic input data signal representing a logarithm of the input value;

(c) applying the logarithmic input data signal to an adder array of array elements, each of the array elements having an adder circuit adding the logarithmic input data signal to a logarithmic multiplier data signal representing a logarithm of a multiplier value to produce a logarithmic output data signal representing a logarithmic output value, add the adder circuit in at least one of the array elements adding the logarithmic input data signal to the logarithmic multiplier data signal a number of times based on a power data signal representing a power value indicating the number of times the logarithmic input data signal is to be added to the logarithmic multiplier data signal;

(d) converting the logarithmic output data signal from each of the array elements to an antilogarithmic output data signal representing an antilogarithm of the logarithmic output value equivalent to the input value multiplied by the multiplier value the number of times indicated by the power data signal; and (e) converting the antilogarithmic output data signal to a fixed point output data signal representing an output value.

14. The method of claim 13 wherein the multiplier value is a weight value.

15. The method of claim 13, further comprising the step (f) of summing, upon receiving the fixed point output data signal for each of the array elements to obtain a plurality of fixed point output data signals, the plurality of fixed point output data signals to produce an output sum data signal.

16. The method of claim 13 wherein the logarithmic input data signal to which the floating point input data signal is converted in step (b) has a same number of bits as the floating point input data signal.

17. The method of claim 16 wherein in step (a) the floating point input data signal has a floating point sign bit, a floating point mantissa portion and a floating point exponent portion, and the logarithmic input data signal has a logarithmic sign bit represented by a same number of bits as the floating point sign bit, a logarithmic integer portion represented by a same number of bits as the floating point mantissa portion, and a logarithmic fraction portion represented by a same number of bits as the floating point exponent portion.

18. The method of claim 13 wherein step (c) includes adding the logarithmic input data signal to the logarithmic multiplier data signal the number of times equal to the power value represented by the power data signal in at least one of the array elements.

* * * * *

UNITED STATES PATENT AND TRADEMARK OFFICE
CERTIFICATE OF CORRECTION

PATENT NO. : 5,608,663
DATED : March 4, 1997
INVENTOR(S) : Stephen L. Smith

It is certified that error appears in the above-identified patent and that said Letters Patent is hereby corrected as shown below:

In column 8, claim 13, line 42, delete "add" and insert --and--.

Signed and Sealed this

Twenty-third Day of September, 1997

Attest:

BRUCE LEHMAN

Attesting Officer

Commissioner of Patents and Trademarks